Oct. 2, 1923.
J. OWENS
METAL HOSE
Filed May 7, 1921
1,469,528
Fig. 1.
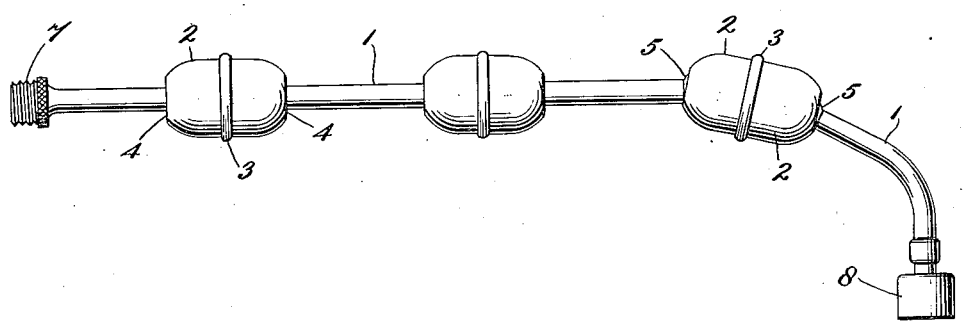
Fig. 2.
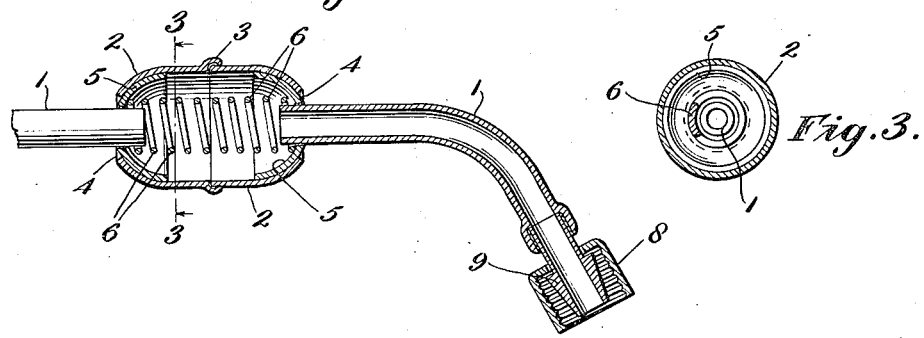
Fig. 3.
Fig. 4.
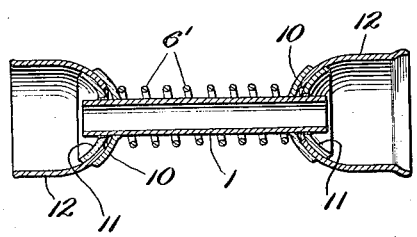
Inventor
John Owens,
By T. G. Witherspoon
Attorney Patented Oct. 2, 1923.

1,469,528

UNITED STATES PATENT OFFICE.

JOHN OWENS, OF WASHINGTON, DISTRICT OF COLUMBIA.

METAL HOSE.

Application filed May 7, 1921. Serial No. 467,609.

*To all whom it may concern:*

Be it known that I, JOHN OWENS, a citizen of the United States, residing at Washington, in the District of Columbia, have invented certain new and useful Improvements in Metal Hose, of which the following is a specification.

This invention relates to a metal hose including a plurality of sections so united together as that the hose may be bent in a plurality of places by reason of suitable couplings between different sections of the hose, the couplings being so constructed that material passing through the hose under great pressure cannot leak through the joints of the coupling. Indeed the construction is designed so that ordinarily the pressure would automatically stop a leak.

The primary object of the invention is to provide a hose suitable for attaching a grease gun to a grease cup for supplying to the latter grease in a semi-liquid condition under great pressure to force out the old grease in a bearing to be lubricated and supply the new grease, and while the hose is capable of withstanding great internal pressure the hose may be bent to reach any desired position.

Another object of the invention is to provide a sectional metal hose, economical to construct and highly efficient in preventing the escape of grease under pressure at the joints of the hose.

With the foregoing objects outlined and other objects in view which will appear as the description proceeds, the invention consists in the novel features hereinafter described in detail, illustrated in the accompanying drawing and more particularly pointed out in the appended claims.

Referring to the drawings:

Figure 1 is an outside view of the hose.

Fig. 2 is a view showing a section of one of the couplings and the end coupling of the hose.

Fig. 3 is a section through the coupling on the line 3—3 of Fig. 2.

Fig. 4 is a section of a modification.

In the drawing 1 designates a section of the hose and 2 the outside casing of the coupling. This casing may consist of two parts constructed separately and afterwards united at or near their ends 3. The complete casing 2 at its ends is semi-spherical in form and at each end may be provided an opening 4 through which a section of the metal hose 1 projects. Within the outer casing are inner semi-spherical parts 5 attached to the hose sections near their ends and fitting snugly within the semi-spherical ends of the outer casing.

A spring 6 holds the semi-spherical inner part of the coupling tightly against the inner semi-spherical ends of the outer casing. The ends of the hose sections may project through the inner semi-spherical parts and form bearings for the ends of the spring, thus keeping the spring in place when the pressure is applied on the grease to force it through the metal hose.

It will be noticed that by firmly soldering, brazing or welding the inner semi-spherical part to the end of the hose and providing holes in the ends of the outer casings very much larger than the ends of the section of the hose that when desired the hose can be bent by forcing the inner semi-spherical part to turn within the outer semi-spherical parts of the outer casing.

It will be further noticed that the pressure on the inner surface of the inner semi-spherical part will tend to force it outwardly against the outer semi-spherical casing and thus automatically prevent leakage of the material being conveyed through the hose.

Since the hose is intended to supply semi-fluid grease from a grease gun to a grease cup there will be times when tremendous pressure is exerted on the inner surface of the hose and the object of this invention is to provide for accidents against breakage under these circumstances and at the same time prevent leakage of the grease through the joint by a cheaply constructed and easily bent coupling.

The hose is provided at one end 7 with means for suitably attaching it to a grease gun and at the end 8 with a cap having therein a conical nipple 9 for attachment to a grease cup.

In the modification shown in Fig. 4 the spring 6' is placed on the outside of one of the hose sections and there is formed a semi-spherical outer part 10 and a semi-spherical inner part 11 and between them is held a casing having semi-spherical ends 12 with a hole through which the section of the hose passes, this hole being much larger than the hose section whereas the holes through the other semi-spherical parts fit tightly around the hose sections being brazed, welded or soldered thereto. With this construction it is evident the couplings between the hose section and the casing will admit of the hose being bent as in the first modification described.

From the foregoing I believe that the construction, operation and advantages of my improved hose and connections will be readily understood by those skilled in the art and I am aware that various changes may be made in the construction illustrated without departing from the spirit of the invention as expressed in the following claims.

I claim as my invention:

1. A metal hose comprising a plurality of metal hose sections, the end sections having respectively means for attachment to a grease gun and a grease cup or the like, a coupling between the sections composed of a casing semi-spherical at its end and hollow interfitting semi-spherical parts attached to the hose sections and a spring having one end in a hollow part for holding the semi-spherical parts together.

2. A metal hose comprising a plurality of metal hose sections, a coupling between each pair of sections composed of a casing substantially semi-spherical at its ends and interfitting hollow semi-spherical parts attached to the hose sections and a spring within the coupling casing having each end in a hollow semi-spherical part for holding the semi-spherical parts in place.

3. A metal hose comprising a plurality of metal hose sections, a coupling between each pair of sections composed of a casing substantially semi-spherical at its ends and interfitting hollow semi-spherical parts with the end hose extended through both the interfitting parts, and a coiled spring within the coupling casing having each end encircling the end of a hose in the hollow semi-spherical parts for holding the semi-spherical parts in place.

In testimony whereof I affix my signature.

JOHN OWENS.